Nov. 1, 1932.                F. HARRIS                 1,885,717
                          MAGNETIC SEPARATOR
                          Filed Oct. 22, 1930
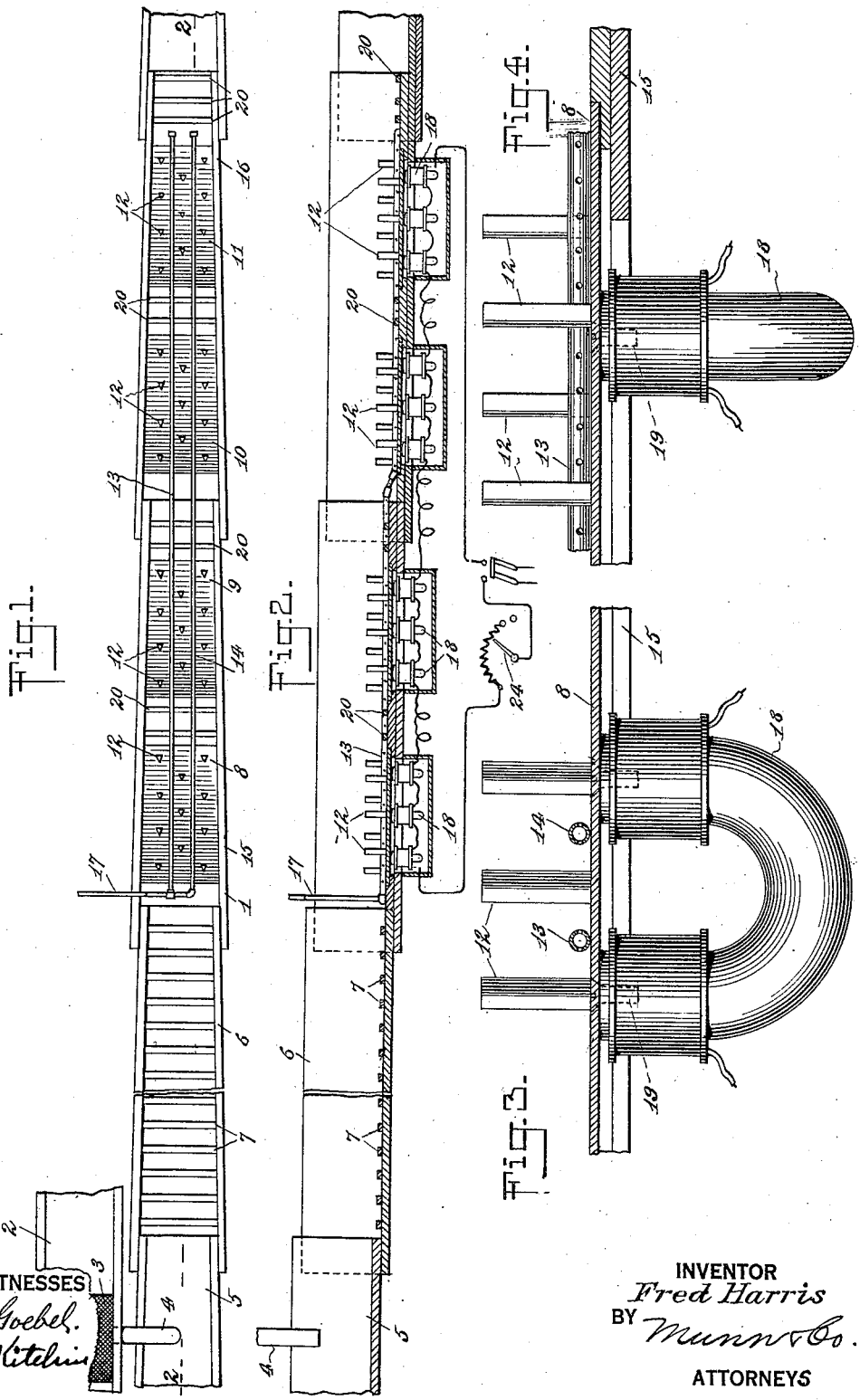
INVENTOR
*Fred Harris*
BY *Munn & Co.*
ATTORNEYS Patented Nov. 1, 1932

1,885,717

UNITED STATES PATENT OFFICE

FRED HARRIS, OF ANCHORAGE, TERRITORY OF ALASKA

MAGNETIC SEPARATOR

Application filed October 22, 1930. Serial No. 490,508.

This invention relates to magnetic separators, the object being to provide a magnetic separator to be used in mining so as to readily separate small particles of magnetic material and other material from the sand and waste matter.

Another object of the invention is to provide a magnetic separator to be used in gold fields in Alaska and elsewhere for separating magnetic material from sand as the sand passes over a flume so as to produce a roughened bed for catching the gold as it moves along.

A further object of the invention is to take fine material from a screen flume and subject the sand to the action of a magnetic field as the sand is moved by water over the field so as to attract the magnetic material from the sand and thereby permit the heavier gold and other particles to readily fall and be caught by the riffles in the flume before the free sand and other waste matter passes out to a dump.

In the accompanying drawing—

Figure 1 is a top plan view of a magnetic separator disclosing an embodiment of the invention;

Figure 2 is a sectional view through Figure 1 on the line 2—2;

Figure 3 is an enlarged fragmentary sectional view through Figure 1 approximately on the line 3—3;

Figure 4 is a view similar to Figure 3 but showing the parts at right angles to the way they are illustrated in Figure 3.

Referring to the accompanying drawing by numerals, 1 indicates a flume adapted to utilize fine material commonly known as "black sand", said fine material being supplied by the screen flume 2. The screen flume 2 may be of any desired length and size and is adapted to receive the coarse material together with a supply of water. As the water moves the coarse material along, the fine sand, small metal particles, fine quantities of gold and other material will pass through the various screens 3 arranged in the flume 2, and from screens 3 this fine material or black sand, as it is known, will pass through one or more pipes 4 into the entrance section 5 of the flume 1. The entrance section 5 has preferably a smooth bottom so that all the material discharged therein will pass on to the section 6 which carries a number of riffles 7.

The riffles 7 will catch the large particles of gold and also some of the heavier metals, which the finer particles of gold or other particles of metal will pass along down the flume 1.

As shown in the accompanying drawing there are provided plates 8, 9, 10 and 11 in the flume 1, said plates being metallic and each carrying a number of upstanding metal bars 12, said metal bars being of iron or some other magnetic material. Preferably the metal bars 12 are triangular-shaped with one edge facing the upper end of the flume whereby the sand and water are divided and small eddies are produced which permit the gold and other heavier metals to settle.

In order to keep the sand loose and thereby give the gold and other heavier metals a proper chance to settle, water pipes 13 and 14 are arranged in the flume 1 from the upper end of section 15 carrying plate 8 to the lower end of section 16 carrying the plate 11. These pipes, as shown in Figure 3, are perforated at intervals and direct water laterally into the flume, which water must change direction as it passes down the flume. This produces retardation and separation of the sand to further permit the gold and heavier materials to sink.

Pipes 13 and 14 are adapted to receive water from pipe 17 which in turn receives it from any suitable supply. Each of the plates 8 is provided with one or more magnets 18, as shown in Figures 3 and 4, said magnets being held in place in any desired manner as, for instance, by screws 19 extending through plate 8 and extending into the core of the magnets.

These magnets are electro-magnets and when the current is turned on the magnetic field produced may be varied according to the amount of material being treated, and also according to the number of magnetic fields used. In Figure 1 four magnetic fields are provided, each plate representing a magnetic field. Under some circumstances less fields are provided, and under others a greater number may be provided. When the current is turned on to the magnets the various plates become magnetized as well as the posts 12. By the use of the posts 12 there is produced a good magnetic field substantially over the entire surface of plates 8 and consequently all the magnetic material in the sand will be drawn towards the posts and towards the plate 8. By reason of the movement of the sand and other particles the magnetic material will eventually find itself deposited on plate 8 where it is held somewhat loosely, although sufficiently to hold it against moving to any great extent. During the use of the device, after a quantity of sand has passed through the flume there will be a coating consisting of magnetic material, for instance, iron or other magnetic particles, together with gold and certain other metals which are comparatively heavy.

As all of the sand and gold are in motion by reason of the water, the gold will quickly work itself way down below the magnetic material held in place by the magnets and will eventually move along and strike one of the riffles 20 where it will clean itself as it is shifted back and forth by the flow of the water and by the passage of the sand. In this way the various riffles 20 catch and hold the gold and possibly other heavy metals, while the various plates 8 and 11 catch and hold the iron and other magnetic material. As the magnetic material is held by the various plates the waste material as, for instance, small pieces of sand, rise to the top of the flowing water and are moved downwardly and finally discharged out of the lower end of the flume. It will be understood that the water flows with some appreciable force so the sand is continually agitated by the water in order to give ample opportunity for the magnets to attract magnetic material and to provide, in a certain sense, a free passageway for the heavier particles as, for instance, gold.

After the flume has been operated for a desired time the water and sand are stopped and the various riffles 20, as well as riffle 6, are cleaned. If desired, also, the matter held by the magnets on plates 8 to 11 may be removed. If this is not desired the current to the magnets may be turned off and the water started flowing again, whereupon the matter heretofore held by the plates 8 to 11 will be washed down and discharged to the end of the flume, thus providing a clean flume for the next operation.

The magnets may be connected up in any desired manner, but usually a sufficient number are provided to take up 110 volts, or whatever voltage is being used in the vicinity of the device. As shown in the accompanying drawing, the various magnets 18 are connected in series by suitable wires 21, and the end magnets by wires 22 and 23 to a suitable rheostat 24. The use of the rheostat 24 is to regulate the magnetic fields so that the magnetic material passing down the flume will not be attracted with too great a force.

If the magnetism is too strong the various plates would soon be covered with the magnetic material held in place rigidly, and, consequently, the gold could not pass therethrough. By holding the magnetic material rather lightly the gold may readily work therethrough. The fact that some of the magnetic material is washed away by the water is of no consequence where gold is being recovered. Where the magnetic material is the desirable material being recovered the magnetism is raised to its maximum so as to catch and hold all possible particles of magnetic material as they pass along over the flume.

I claim—

1. A magnetic separator for separating gold and magnetic material from black sand comprising a flume having a plurality of groups of riffles, said groups being spaced apart, a metallic plate forming the bottom of said flume between said groups of riffles, bars upstanding from said plate, said bars being triangular in cross section and having one edge facing the flume entrance to divide the oncoming fluid and produce eddies, means for magnetizing said plates and bars for attracting magnetic material thereto and producing a rough surface, whereby sand and gold passing over said rough surface will be agitated so that the gold may be more easily separated from the sand and find its way by gravity against said riffles, and means extending over said metal plate and the riffles for directing water transversely of the flume near the bottom thereof for causing the black sand to be agitated as it moves downwardly through the flume.

2. A magnetic separator for separating gold and magnetic materials from black sand, said separator comprising a flume, a plurality of magnetic bars upstanding from the bottom of the flume, said bars being triangular in cross section and having one edge facing the flume entrance to divide the oncoming fluid and produce eddies, a group of riffles adjacent to said bars, and a water pipe on the bottom of the flume extending longitudinally of the flume and having side perforations, said perforations directing water streams laterally of the flume into said eddies and among said riffles to produce a turbulence.

FRED HARRIS.